(12) United States Patent
Nelson et al.

(10) Patent No.: US 9,074,936 B2
(45) Date of Patent: Jul. 7, 2015

(54) MULTIDIMENSIONAL PULSE SHAPER AND SPECTROMETER

(75) Inventors: Keith A. Nelson, Newton, MA (US); Kenan Gundogdu, Cary, NC (US); Katherine W. Stone, Somerville, MA (US); Daniel B. Turner, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1695 days.

(21) Appl. No.: 12/147,842

(22) Filed: Jun. 27, 2008

(65) Prior Publication Data

US 2009/0116009 A1    May 7, 2009

Related U.S. Application Data

(60) Provisional application No. 60/953,121, filed on Jul. 31, 2007.

(51) Int. Cl.
| | |
|---|---|
| *G01J 3/28* | (2006.01) |
| *G01J 3/433* | (2006.01) |
| *G01J 3/02* | (2006.01) |
| *G01J 3/12* | (2006.01) |

(52) U.S. Cl.
CPC .. *G01J 3/433* (2013.01); *G01J 3/02* (2013.01); *G01J 3/0224* (2013.01); *G01J 2003/1286* (2013.01); *G02F 2203/18* (2013.01); *G02F 2203/26* (2013.01)

(58) Field of Classification Search
USPC .................................. 356/300, 326; 359/238
See application file for complete search history.

(56) References Cited

U.S. PATENT DOCUMENTS

| | | | |
|---|---|---|---|
| 5,100,234 A | 3/1992 | Ishibashi et al. | |
| 5,682,262 A * | 10/1997 | Wefers et al. | 359/305 |
| 5,719,650 A | 2/1998 | Wefers et al. | |
| 5,838,433 A | 11/1998 | Hagiwara | |
| 6,479,822 B1 | 11/2002 | Nelson et al. | |
| 6,654,521 B2 | 11/2003 | Sheng et al. | |
| 2006/0017999 A1 | 1/2006 | Vaughan et al. | |

OTHER PUBLICATIONS

Assion et al., "Control of Chemical Reactions by Feedback-Optimized Phase-Shaped Femtosecond Laser Pulses", Science 282:919-22 (1998).
Dudovich et al., "Single-pulse coherently controlled nonlinear Raman spectroscopy and microscopy", Nature 418:512-514 (2002).
Hacker et al., "Micromirror SLM for femtosecond pulse shaping in the ultraviolet", Applied Physics B 76, 711-14 (2003).
Hornung et al., "Degenerate four-wave mixing spectroscopy based on two dimensional femtosecond pulse shaping", Optics Letters, 29, 2052-4 (2004).

(Continued)

*Primary Examiner* — Abdullahi Nur
(74) *Attorney, Agent, or Firm* — Fish & Richardson P.C.

(57) ABSTRACT

Methods and apparatus are disclosed, and include: (a) separating an input electromagnetic waveform into a plurality of intermediate waveforms, each of the intermediate waveforms being spatially separated from one another; (b) dispersing frequency components of each intermediate waveform onto different regions of a spatial light modulator and modulating at least some of the dispersed frequency components with the spatial light modulator; and (c) recombining the dispersed frequency components for each of the intermediate waveforms to produce a plurality of temporally shaped output waveforms.

36 Claims, 3 Drawing Sheets

(56) References Cited

OTHER PUBLICATIONS

Levis et al., "Selective Bond Dissociation and Rearrangement with Optimally Tailored, Strong-Field Laser Pulses", Science 292:709-13 (2001).

Sardesai et al., "A Femtosecond Code-Division Multiple-Access Communication System Test Bed", Journal of Lightwave Technology 16:1953-64 (1998).

Vaughan et al., "Automated two-dimensional femtosecond pulse shaping", Journal of the Optical Society of America B 19:2489-95 (2002).

Vaughan et al., "Diffraction-based femtosecond pulse shaping with a two-dimensional spatial light modulator", Optics Letters 30, 323-5 (2005).

Wefers et al., "Analysis of programmable ultrashort waveform generation using liquid-crystal spatial light modulators", Journal of the Optical Society of America B 12:1343-62 (1995).

Wefers et al., "Automated multidimensional coherent optical spectroscopy with multiple phase-related femtosecond pulses", Journal of Chemical Physics 102:9133-6 (1995).

Wefers et al., "Generation of high-fidelity programmable ultrafast optical waveforms", Optics Letters 20:1047-9 (1995).

Weiner et al., "Programmable Shaping of Femtosecond Optical Pulses by Use of 128-Element Liquid Crystal Phase Modulator", IEEE Journal of Quantum Electronics 28:908-20 (1992).

Weiner et al., "Synthesis of phase-coherent picosecond optical square pulses", Optics Letters 11:153-5 (1986).

Weiner, A.M., "Femtosecond pulse shaping using spatial light modulators", Review of Scientific Instruments 71:1929-60 (2000).

Witte et al., "Programmable amplitude- and phase-modulated femtosecond laser pulses in the mid-infrared", Optics Letters 27:131-3 (2002).

* cited by examiner

MULTIDIMENSIONAL PULSE SHAPER AND SPECTROMETER

CROSS-REFERENCE TO RELATED APPLICATIONS

This application claims priority to U.S. Provisional Application No. 60/953,121, filed on Jul. 31, 2007, the entire contents of which are incorporated herein by reference.

STATEMENT AS TO FEDERALLY SPONSORED RESEARCH

The subject matter of this disclosure was made with Government support under National Science Foundation grant number CHE-0212375. This invention was made with government support under grant numbers CHE-0507147 and CHE-0616939 awarded by the National Science Foundation. The Government has certain rights in this invention.

TECHNICAL FIELD

This disclosure relates generally to optical beams and, more particularly, to optical pulse shaping.

BACKGROUND

Optical pulse shaping methods can be used to adjust the properties of ultrafast optical pulses. For example, in an optical pulse shaper, the amplitude and/or phase of an input optical waveform can be adjusted to yield an output optical waveform with a different temporal and/or spatial profile, relative to the input waveform.

The development of a commercial apparatus for computer-controlled, high-fidelity phase and amplitude pulse shaping has greatly facilitated the application of pulse shaping methods to diverse problems such as optical characterization of materials, time-division multiplexing in signaling systems, laser microscopy, and optical control of matter. Transformation of a single input optical pulse into one or more output pulses by manipulating the spectral properties of the input pulse in controlled fashion can be achieved through the use of a liquid crystal spatial light modulator array of the type manufactured by, for example, Cambridge Research & Instrumentation (Woburn, Mass.). Such a device includes two one-dimensional liquid crystal spatial light modulators, each oriented in a plane transverse to the light propagation direction. Liquid crystal modulators are typically transmissive for optical wavelengths in the range 400-1600 nm, and can be refreshed at a rate of roughly 10-100 ms, affording a means of adjusting either the phase or, in combination with additional optics, the amplitude of an input pulse with each one-dimensional spatial light modulator. To shape both the amplitude and phase of an optical waveform, both one-dimensional spatial light modulators are typically aligned and operated together.

Shaped optical waveforms can be used to measure properties of samples.

SUMMARY

In general, in a first aspect, the disclosure features a method that includes: (a) separating an input electromagnetic waveform into a plurality of intermediate waveforms, each of the intermediate waveforms being spatially separated from one another; (b) dispersing frequency components of each intermediate waveform onto different regions of a spatial light modulator and modulating at least some of the dispersed frequency components with the spatial light modulator; and (c) recombining the dispersed frequency components for each of the intermediate waveforms to produce a plurality of temporally shaped output waveforms.

Embodiments of the method can include one or more of the following features.

The frequency components can be dispersed on the spatial light modulator along a first direction and the spatial light modulator can modulate the frequency components by diffracting them into multiple diffraction orders along a second direction different from the first direction.

The method can include focusing the plurality of temporally shaped output waveforms to a common region of a sample. The method can include monitoring a change in a property of at least one of the output waveforms after it passes through the sample in response to changes in the modulation of one or more of the intermediate waveforms by the spatial light modulator. The method can include monitoring a change in a property of an additional waveform emerging from the sample in response to changes in the modulation of one or more of the intermediate waveforms by the spatial light modulator.

The change in modulation of the one or more intermediate waveforms can cause a temporal delay between two or more of the output waveforms.

A second modulator can be used to separate the input waveform into the plurality of output waveforms. The second modulator can be a diffractive optical element. The second modulator can modulate a phase of the input electromagnetic waveform along two directions to produce the plurality of intermediate waveforms Modulating at least some of the dispersed frequency components can include modulating a phase of at least some of the frequency components. Modulating the phase of at least some of the frequency components can include varying the phase of the at least some of the frequency components along the first direction.

Modulating at least some of the dispersed frequency components can include modulating an amplitude of at least some of the frequency components. Modulating the amplitude of at least some of the frequency components can include varying the amplitude of at least some of the frequency components along the second direction. Varying the amplitude of at least some of the frequency components along the second direction can include diffracting at least some of the frequency components along the second direction into multiple diffraction orders and selecting a subset of the multiple diffraction orders.

The number of output waveforms can be the same as the number of intermediate waveforms. The number of output waveforms can be four. The number of output waveforms can be three.

The first and second directions can be orthogonal.

Modulating the phase of at least some of the frequency components can include applying different phase modulations to at least some corresponding frequency components of each of the intermediate waveforms. Modulating the amplitude of at least some of the frequency components can include applying different amplitude modulations to at least some corresponding frequency components of each of the intermediate waveforms. Modulating at least some of the dispersed frequency components can include modulating a phase and an amplitude of at least some of the dispersed frequency components.

Separating the input electromagnetic waveform into a plurality of intermediate waveforms can include modulating a phase of the input electromagnetic waveform along two orthogonal directions. The method can include modulating the phase of the input electromagnetic waveform so that the output waveforms satisfy a phase matching condition at a sample position.

The method can include modulating at least some of the dispersed frequency components so that the output waveforms satisfy a phase matching condition at a sample position.

The plurality of output waveforms can include four output waveforms that propagate with respect to an optical axis. Points of intersection of the four output waveforms with a plane transverse to the optical axis can be positioned at each of four corners of a rectangle, the optical axis being positioned at the center of the rectangle.

The plurality of output waveforms can include three output waveforms that propagate with respect to an optical axis. Points of intersection of the three output waveforms with a plane transverse to the optical axis are positioned at three of the four corners of a rectangle, the optical axis being positioned at the center of the rectangle.

Two of the plurality of output waveforms can be incident on the sample at a first time, and a third of the plurality of output waveforms can be incident on the sample at a second time later than the first time.

Each of the plurality of output waveforms can be incident on the sample at a different time.

Two of the plurality of output waveforms can form a periodic modulation in an index of refraction of the sample.

The method can include monitoring changes in a property of a waveform emerging from the sample in response to changes in the modulation of one or more of the intermediate waveforms, and analyzing the changes to determine at least one of vibrational information about the sample, electronic information about the sample, and structural information about the sample. The changes in the property of the waveform can correspond to a photon echo signal from the sample. The changes in the property of the waveform can correspond to diffraction of an output waveform from a periodic modulation of an index of refraction in the sample. The changes in the property of the waveform correspond to diffraction of an output waveform from a vibrational wave in the sample.

The method can include directing the four output waveforms to be incident on a sample and monitoring changes in a property of a waveform emerging from the sample along a direction parallel to a direction of propagation of one of the four output waveforms entering the sample in response to changes in the modulation of one or more of the intermediate waveforms.

The method can include monitoring changes in a property of a waveform emerging from the sample in response to changes in the modulation of one or more of the intermediate waveforms, where the monitoring comprises measuring an interference signal.

The method can include, after modulating at least some of the dispersed frequency components, further modulating at least one of a phase and an amplitude of at least one of the output waveforms.

Modulating at least some of the dispersed frequency components can include modulating a polarization state of an electric field of at least some of the frequency components. Modulating the polarization state of at least some of the frequency components can include directing the at least some of the frequency components to pass through at least one waveplate. Modulating the polarization state of at least some of the frequency components can include modulating at least one of an amplitude and a phase of the at least some of the frequency components, and modulating the polarization state based on the modulation of the at least one of the amplitude and the phase.

At least some of the output waveforms can include more than one optical pulse.

A full width at half maximum spectral bandwidth of each of the output waveforms can be 5 nm or more.

Embodiments of the method can include any of the other features disclosed herein, as appropriate.

In another aspect, the disclosure features an apparatus that includes: (a) a beam shaper configured to separate an input electromagnetic waveform into a plurality of intermediate waveforms, each of the intermediate waveforms being spatially separated from one another; (b) dispersing optics positioned to disperse frequency components of each of the intermediate waveforms; (c) a spatial light modulator positioned so that the frequency components of each of the intermediate waveforms are dispersed onto different regions of the spatial light modulator, and configured to modulate at least some of the dispersed frequency components; and (d) output optics positioned to combine the dispersed frequency components of each of the intermediate waveforms to produce a plurality of temporally shaped output waveforms.

Embodiments of the apparatus can include one or more of the following features.

The frequency components of the intermediate waveforms can be dispersed on the spatial light modulator along a first direction, and the spatial light modulator can be configured to diffract the frequency components into multiple diffraction orders along a second direction different from the first direction.

The output optics can be configured to combine selected orders of the multiple diffraction orders to produce the output waveforms. The combined selected orders of the multiple diffraction orders may not comprise a zeroth diffraction order.

The dispersing optics and the output optics can share one or more common elements.

The spatial light modulator can be configured to modulate the dispersed frequency components by modulating a phase of the frequency components.

The beam shaper can include a two-dimensional binary phase grating.

The beam shaper can include a two-dimensional modulator that includes a plurality of independently adjustable regions.

The spatial light modulator can include a two-dimensional modulator that includes a plurality of independently adjustable regions.

The apparatus can include an electronic controller coupled to the spatial light modulator and configured to adjust the spatial light modulator to modulate the frequency components, and a detector positioned to measure a signal waveform from a sample that is exposed to the output waveforms.

The apparatus can include a second spatial light modulator, where the spatial light modulators are configured to independently modulate each of the frequency components of each of the intermediate waveforms.

Each of the output waveforms can include a different amplitude and phase profile relative to the other output waveforms.

Embodiments of the apparatus can further include any of the other features disclosed herein, as appropriate.

As used herein, a "modulator" means any passive or active device that can change the optical properties of an incident beam. The modulator may operate in a forward mode (e.g., transmissive) or backward mode (e.g., reflective). An active modulator means a modulator that is optically and/or electrically addressable at one or more locations to change the optical properties of an incident beam. Spatial light modulators ("SLMs") are active modulators that are independently addressable at multiple locations, and include liquid crystal light modulators, acousto-optic spatial light modulators, MEMS devices, deformable mirrors, and other devices that modulate, along one or more dimensions, properties of light such as the amplitude and/or phase and/or polarization. Passive modulators can include beam splitting and/or beam manipulation optics, such as refractive or diffractive optical elements, which do not include multiple optically and/or electrically addressable regions. For example, in preferred embodiments, a diffractive optical element is used to manipulate the phase front of an incident beam to produce three or four beams, which when collimated by a downstream lens or curved mirror correspond to three or four corners of a rectangle (e.g., a square), respectively. This is useful for various four-wave spectroscopy techniques, as described herein. As used herein, a square is a specific example of a rectangle.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control.

In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Techniques for shaping optical waveforms are disclosed in the following patents and patent applications: U.S. Pat. No. 5,719,650, entitled "HIGH FIDELITY SPATIAL LIGHT MODULATOR"; U.S. Pat. No. 5,682,262, entitled "METHOD AND DEVICE FOR GENERATING SPATIALLY AND TEMPORALLY SHAPED OPTICAL WAVEFORMS"; and U.S. Patent Application Publication Number US 2006/0017999, entitled "DIFFRACTION-BASED PULSE SHAPING WITH A 2D OPTICAL MODULATOR." The entire contents of each of these patents and patent applications are incorporated herein by reference.

Multidimensional spectrometers can be used to investigate a wide variety of properties and phenomena in samples. In particular, multidimensional spectrometers can be used to determine information about sample that is difficult to obtain in any other manner, such as vibrational and/or electronic relaxation information. By examining coupled sample responses as a function of multiple different parameters (e.g., along multiple different temporal coordinates, and/or multiple different frequency coordinates), information about sample structure (e.g., dielectric information, vibrational information, electronic information) can be obtained.

Multidimensional spectrometers can function by exposing a sample to multiple output waveforms, some of which can be temporally delayed relative to others. The frequency bandwidth, spatial profile, temporal profile, and electric field polarizations of the output waveforms can be chosen to selectively enhance and/or diminish certain sample responses. Multidimensional spectrometers acquire sample information along two or more measurement coordinates (e.g., two or more frequency axes), so that the information is typically obtained as two-dimensional (or higher-dimensional) sample response spectra.

Figure 1:
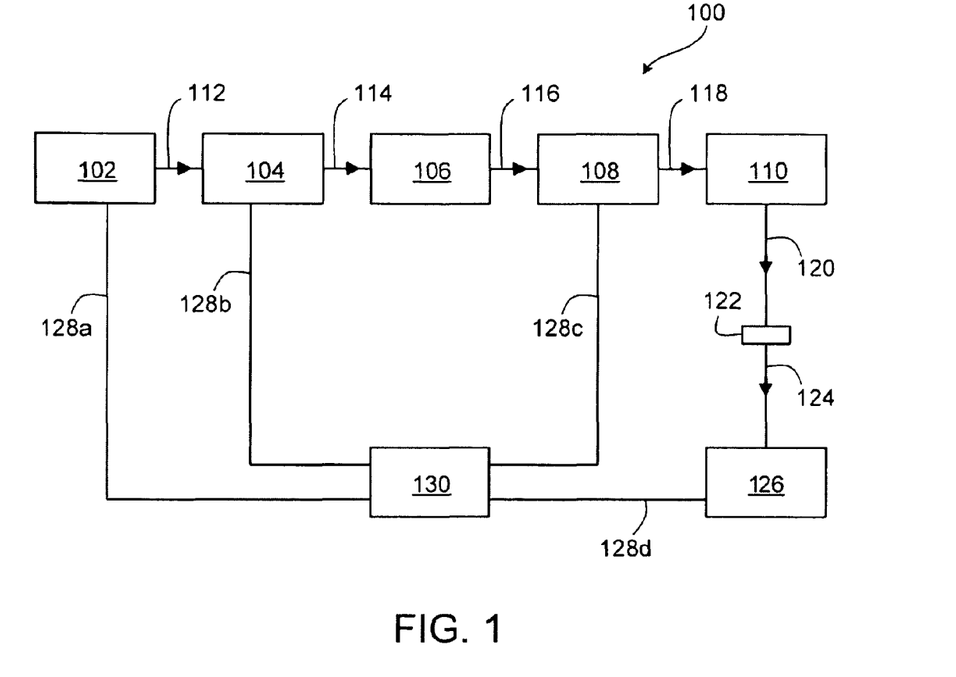
FIG. 1 is a schematic diagram of a spectrometer system.

FIG. 1 shows a multidimensional spectrometer system 100. System 100 includes a radiation source 102, a beam shaper 104, dispersing optics 106, a modulating system 108, and output optics 110. Radiation source 102 is configured to generate an input waveform 112. Radiation source 102 can include one or more lasers and/or laser-based devices (e.g., laser amplifiers), for example. Input waveform 112 can include, in general, radiation in one or more of the extreme ultraviolet, ultraviolet, visible, near-infrared, infrared, and/or microwave regions of the electromagnetic spectrum. Input waveform 112 can include radiation spanning a band of spectral frequencies. For example, input waveform 112 can include a distribution of frequency components having a full width at half maximum of 1 nm or more (e.g., 2 nm or more, 5 nm or more, 10 nm or more, 15 nm or more, 20 nm or more, 30 nm or more, 40 nm or more, 50 nm or more 75 nm or more).

In certain embodiments, source 102 can be a pulsed laser source, and input waveform 112 includes one or more pulses of radiation. In some embodiments, at least some of the one or more pulses can have full width at half maximum temporal durations of 10 ps or less (e.g., 5 ps or less, 2 ps or less, 1 ps or less, 800 fs or less, 600 fs or less, 400 fs or less, 200 fs or less, 100 fs or less, 75 fs or less, 50 fs or less, 25 fs or less, 20 fs or less, 15 fs or less, 10 fs or less, 5 fs or less, or even less).

Beam shaper 104 is configured to receive input waveform 112, and to generate from input waveform 112 a plurality of intermediate waveforms 114, each spatially separated from the other intermediate waveforms. The intermediate waveforms 114 can each have certain properties in common with input waveform 112. For example, the spectral distribution of frequency components in one or more of intermediate waveforms 114 can be similar to, or the same as, input waveform 112. As another example, the temporal profile of one or more of intermediate waveforms 114 can be similar to, or the same as, input waveform 112.

In some embodiments, beam shaper 104 generates intermediate waveforms 114 by applying a phase-only modulation to input waveform 112 in each of two directions (e.g., each of two orthogonal directions). Beam shaper 104 can include, for example, one or more passive modulators (e.g., fixed masks such as transmissive binary phase masks upon which input waveform 112 is incident). In certain embodiments, beam shaper 104 can include one or more active modulators configured to apply a phase-only modulation to input waveform 112. Suitable active modulators can include one or more liquid crystal modulators, one or more deformable mirror-based modulators, one or more MEMS-based modulators, one or more acousto-optic modulators, and/or additional types of adjustable, programmable modulators. By using a modulator that imparts phase-only modulation to input waveform 112 to produce intermediate waveforms 114 rather than, for example, a fixed spatial filtering mask, scattered light that typically arises from diffraction at the edges of spatial masks can be reduced or eliminated. In general, beam shaper 104 can include one or more modulators configured for operation in transmission mode, and/or one or more modulators configured for operation in reflection mode.

In addition to, or as an alternative to, applying a phase modulation to input waveform 112, in some embodiments beam shaper 104 can apply an amplitude modulation to input waveform 112. For example, beam shaper 104 can include components (e.g., passive masks and/or active modulators, as discussed above) that are configured to modify the amplitude of input waveform 112. In certain embodiments, for example, by dispersing frequency components of input waveform 112 along one direction, diffracting the frequency components along another orthogonal direction into multiple diffraction orders, selecting certain of the multiple diffraction orders, and then recombining the selected dispersed and diffracted orders of the frequency components, an amplitude modulation can be applied to input waveform 112. Other techniques for applying an amplitude modulation to input waveform 112 include phase-to-amplitude modulation and/or polarization-to-amplitude modulation of input waveform 112 using passive and/or active modulators.

Intermediate waveforms 114 include a plurality of spatially separated waveforms, each derived from input waveform 112. The amplitudes and/or phases of some or all of the intermediate waveforms can be modulated with respect to one another by beam shaper 104. After emerging from beam shaper 104, intermediate waveforms 114 are incident on dispersing optics 106, which disperse the frequency components of each of the intermediate waveforms 114 along a third direction. In some embodiments, the third direction can be parallel to or orthogonal to either the first or the second direction. In certain embodiments, the third direction is neither parallel to nor orthogonal to either the first or second direction.

Dispersive optics 106 typically include one or more dispersive elements. Exemplary dispersive elements include, but are not limited to, reflective diffraction gratings, transmissive diffraction gratings, and prisms. Combinations of multiple dispersive elements can also be used to spatially disperse the frequency components of each of intermediate waveforms 114.

The dispersed intermediate waveforms 116 are then incident on modulating system 108. In general, modulating system 108 can be configured to apply independent phase and/or amplitude modulations to some or all of the dispersed frequency components of each of dispersed intermediate waveforms 116. Modulating system 108 can include one or more passive elements such as phase and/or amplitude masks, and/or one or more active modulators such as one or more liquid crystal modulators, one or more deformable mirror-based modulators, one or more MEMS-based modulators, one or more acousto-optic modulators, and/or additional types of adjustable modulators with multiple independently addressable regions, as discussed above.

In some embodiments, modulating system 108 can be operated in a diffractive pulse shaping mode. In this mode, modulating system 108 can apply individually selected temporal delays to each of dispersed intermediate waveforms 116. Applying the temporal delays generally corresponds to adjusting the phases of the dispersed frequency components in a direction parallel to the direction in which the components are dispersed by dispersing optics 106 (e.g., along the third direction). Each of the dispersed frequency components of each of the intermediate waveforms 114 is spatially extended along a fourth direction orthogonal to the third direction, and modulating system 108 can apply a periodic modulation (e.g., a phase modulation) along the fourth direction to diffract each of the spatially extended frequency components into multiple diffraction orders along the fourth direction. The periodic modulation that is applied along the fourth direction can be adjusted to control the diffraction efficiency of each of the frequency components, and subsequent spatial filtering (e.g., by output optics 110) can be used to selectively combine certain modulated frequency components to form output waveforms 120.

Modulated intermediate waveforms 118 correspond to the dispersed (and, in some embodiments, diffracted) frequency components of the dispersed intermediate waveforms 116. The modulated intermediate waveforms 118 are incident on output optics 110, which combine the frequency components to form output waveforms 120. In diffractive pulse shaping mode, output optics 110 can be configured to combine only some of the multiple diffraction orders of the frequency components of intermediate waveforms 118. By selecting only some of the multiple diffraction orders for recombination, an amplitude modulation can be applied to output waveforms 120. To select some of the multiple diffraction orders of frequency components, output optics 110 can include a spatial filter (e.g., a beam stop), for example, which can be configured to select any desired subset of the multiple diffraction orders for the frequency components.

In some embodiments, in diffractive pulse shaping mode, a polarization modulation can be applied to output waveforms 120. For example, output optics 110 can include polarization-manipulating elements (e.g., one or more waveplates) which allow the electric field polarization of each of the modulated intermediate waveforms 118 to be adjusted via suitable configuration of modulating system 108. In certain embodiments, polarization-manipulating elements can be incorporated directly into modulating system 108 to adjust the electric field polarizations of modulated intermediate waveforms 118.

More generally, output optics 110 are configured to combine the dispersed frequency components of modulated intermediate waveforms 118 (e.g., when second modulator 108 is configured for operation in a diffractive pulse shaping mode or in another pulse shaping mode) to form output waveforms 120. Output optics 110 can include one or more dispersive elements (e.g., a reflective or transmissive diffraction grating, a prism, and/or other types of diffractive elements) and various other elements such as lenses, beamsplitters, filters, and mirrors. Some of the elements of output optics 110 (e.g., the one or more dispersive elements) can be common to dispersing optics 106.

In some embodiments, the number and spatial arrangement of output waveforms 120 is the same as in intermediate waveforms 114. For example, in certain embodiments first modulator 104 can be configured to receive a single input waveform 112 and to produce four intermediate waveforms 114. The four intermediate waveforms 114 propagate in a common direction after leaving beam shaper 104, and intersect a plane transverse to their common direction at four corners of a rectangle. Output waveforms 120, which can also propagate in a common direction after leaving output optics 110, also intersect a plane transverse to their common propagation direction at four corners of a rectangle.

Output waveforms 120 can each include, in general, radiation in one or more of the extreme ultraviolet, ultraviolet, visible, near-infrared, infrared, and/or microwave regions of the electromagnetic spectrum. Each of output waveforms 120 can include radiation spanning a band of spectral frequencies. For example, each of output waveforms 120 can include a distribution of frequency components having a full width at half maximum of 1 nm or more (e.g., 2 nm or more, 5 nm or more, 10 nm or more, 15 nm or more, 20 nm or more, 30 nm or more, 40 nm or more, 50 nm or more 75 nm or more).

In certain embodiments, source 102 can be a pulsed laser source, and one or more of output waveforms 120 can include one or more pulses of radiation. In some embodiments, at least some (or even all) of the one or more pulses can have full width at half maximum temporal durations of 10 ps or less (e.g., 5 ps or less, 2 ps or less, 1 ps or less, 800 fs or less, 600 fs or less, 400 fs or less, 200 fs or less, 100 fs or less, 75 fs or less, 50 fs or less, 25 fs or less, 20 fs or less, 15 fs or less, 10 fs or less, 5 fs or less, or even less).

In some embodiments, output waveforms 120 can be incident on a sample 122 (e.g., in either transmission or reflection measurement mode), as shown in FIG. 1. Beam shaper 104 and modulating system 108, dispersing optics 106, and output optics 110 are configured to produce output waveforms 120 which induce a response in sample 122 in the form of signal waveform 124. Detector 126 is positioned to detect and/or analyze signal waveform 124. Detector 126 can include one or more different types of detectors for measuring radiation, including, but not limited to, CCD detectors, photomultipliers, photodiodes, and other radiation-sensitive elements. Detector 126 can include wavelength-sensitive and/or—resolving devices such as spectrometers and/or monochromators. In addition, detector 126 can include other electronic components such as lock-in amplifiers, timing signal generators, and power supplies, and elements such as lenses, mirrors, filters, beamsplitters, nonlinear crystals (e.g., for frequency conversion), and other elements.

Electronic control system 130 can be in electrical communication with radiation source 102, beam shaper 104, modulating system 108, and detector 126 via electrical communication lines 128a-d, respectively. Electronic control system 130 can include an electronic processor, an interface for displaying information, and an interface for entering information (e.g., for a system operator to enter information). Control system 130 can operate fully automatically or with manual input from a system operator, and can generate control signals for some or all of radiation source 102, beam shaper 104, modulating system 108, and detector 126. Control system 130 can also receive status information from each of these devices. Further, control system 130 can direct the various components of system 100 to generate output waveforms 120 which are incident on sample 122, to measure signal waveform 124 from sample 122 using detector 126, and to transmit to control system 130 representations of the measured signals from detector 126. Electronic control system 130 can analyze the measured signals to determine information about sample 122, and can display the measured signals as multidimensional spectra (e.g., signal intensity as a function of two or more temporal coordinates, frequency coordinates, or other waveform parameters) on the display interface.

In some embodiments, either or both of beam shaper 104 and modulating system 108 can be adjusted by electronic control system 130 based on one or more feedback signals. For example, detector 126 or another detector can be configured to measure signal waveform 124 or another signal emerging from sample 122, and to provide a representation of the measured signal to electronic control system 130. Electronic control system 130 can analyze the signal (and/or one or more components thereof), and can then adjust beam shaper 104 and/or modulating system 108 based on the measured signal. Components of the measured signal that can be selected and analyzed by electronic control system 130 include signal components that correspond to specific types of sample responses that system 100 is configured to measure, e.g., certain types of nonlinear optical responses of sample 122.

Feedback-controlled adjustment of beam shaper 104 and/or modulating system 108 can be performed as part of a machine-learning algorithm (e.g., a genetic algorithm or a neural network algorithm) and/or as part of a phase cycling measurement algorithm. In certain embodiments, adjustment of beam shaper 104 and/or modulating system 108 can occur in real-time or nearly in real-time in response to the measured signal.

Figure 2:
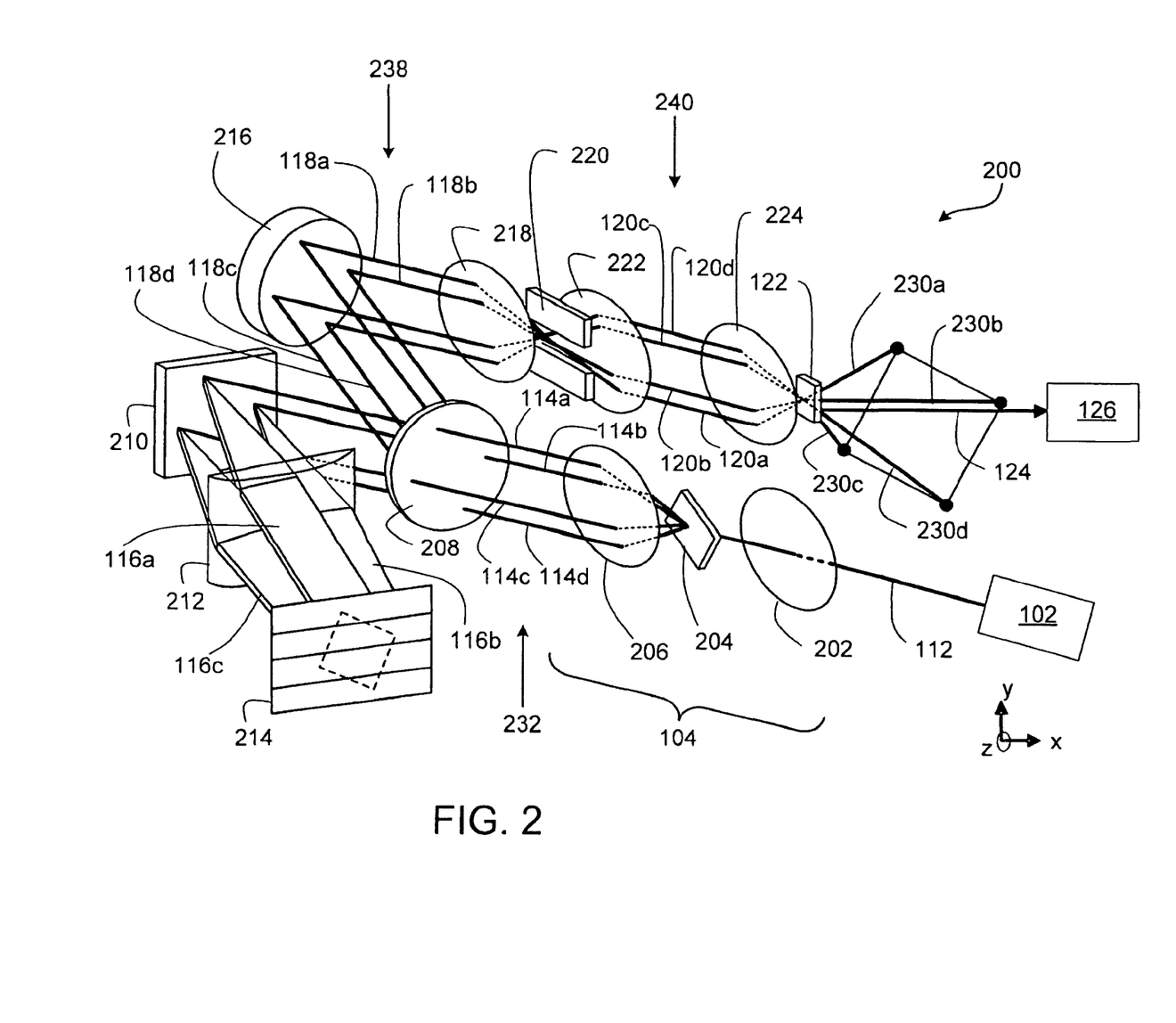
FIG. 2 is a schematic diagram of an embodiment of a multidimensional spectrometer.

An embodiment of a multidimensional spectrometer 200 is shown in FIG. 2. Spectrometer 200 includes a radiation source 102 that provides an input waveform 112. Input waveform 112 is incident on a beam shaper 104 that includes a first lens 202, a diffractive element 204, and a second lens 206. In the embodiment shown in FIG. 2, first lens 202 focuses input waveform 112 onto diffractive element 204. In some embodiments, diffractive element 204 is located at the beam waist of a lens system (e.g., a telescope). For example, when input waveform 112 has a high intensity, placing diffractive element 204 at the focus of first lens 202 may result in damage to diffractive element 204. Diffractive element 204 can be placed, instead, at a beam waist produced by a slightly misaligned telescope of arbitrary magnification. The magnification of the telescope can be chosen to ensure that the beam waist is large enough so that the fluence of input waveform 112 is less than the damage threshold of diffractive element 204 (or another active or passive modulator used in place of diffractive element 204).

Diffractive element 204 includes a two dimensional binary phase grating. When input waveform 112 passes through diffractive element 204, the diffractive element applies a two dimensional spatial binary phase modulation to input waveform 112 to generate four intermediate waveforms 114a-d. The four intermediate waveforms 114a-d are collimated by second lens 206, so that after passing through second lens 206, each of the intermediate waveforms 114a-d propagates in a direction parallel to an optical axis of beam shaper 104. In FIG. 2, the optical axis of beam shaper 104 coincides with the direction of propagation of input waveform 112.

Each of intermediate waveforms 114a-d passes through beamsplitter 208 and is incident on diffraction grating 210, which disperses the frequency components of each of intermediate waveforms 114a-d along the x-direction in FIG. 2. Cylindrical lens 212 collimates the diverging frequency components of each of dispersed intermediate waveforms 116 and directs the collimated frequency components to be incident on a modulator 214.

Modulator 214 (e.g., typically an active two-dimensional modulator configured for operation in a diffractive pulse shaping mode) can apply a phase modulation to the dispersed frequency components of each of dispersed intermediate waveforms 116 by adjusting individually addressable regions of the modulator. The dispersed frequency components extend spatially in a direction perpendicular to the x-direction on modulator 214 (e.g., the y-direction). Modulator 214 can be configured to apply a periodic modulation to some or all of the spatially extended frequency components in the y-direction to diffract the frequency components in the y-direction into multiple diffraction orders.

Modulator 214 is configured for operation in reflective mode in FIG. 2, and so modulated intermediate waveforms 118a-d that include spatially dispersed and/or diffracted frequency components propagate from modulator 214 back through cylindrical lens 212, which converges the frequency components of modulated intermediate waveforms 118*a-d* onto diffraction grating 210. Modulated intermediate waveforms 118*a-d* propagate along trajectories that are spatially coincident with, or nearly spatially coincident with, the trajectories of intermediate waveforms 114*a-d*, respectively.

Upon reaching beamsplitter 208, a portion of each of the modulated intermediate waveforms 118*a-d* is reflected by the beamsplitter and is incident on mirror 216. Modulated intermediate waveforms 118*a-d* then pass through a lens 218, which focuses each of modulated intermediate waveforms 118*a-d* to a common focal plane in which a spatial filter 220 is positioned. Spatial filter 220 is typically configured to filter some or all of modulated intermediate waveforms 118*a-d* to remove certain frequency components (and/or diffraction orders thereof) from the modulated intermediate waveforms. Following this filtering operation, the diverging modulated intermediate waveforms 118*a-d* are collimated by lens 222 to form output waveforms 120*a-d*, respectively.

Lens 224 focuses each of output waveforms 120*a-d* onto a sample 122. Output waveforms 120*a-d* enter sample 122 (and, in some embodiments, emerge from sample 122) along propagation directions 230*a-d*, respectively. A signal waveform 124 emerges from sample 122 in response to output waveforms 120, and can be measured by detector 126.

In some embodiments, spectrometer 200 can be configured for operation in a heterodyne detection mode. In heterodyne mode, signal waveform 124 emerges from sample 122 along a direction that is spatially coincident with a direction of one of the output waveforms 120*a-d* emerging from sample 122. As shown in FIG. 2, for example, signal waveform 124 can emerge from sample 122 along the same direction as output waveform 120*b*. Typically, the field amplitude of the portion of output waveform 120*b* that emerges from sample 122 is significantly larger than the field amplitude of signal waveform 124. The portion of output waveform 120*b* that emerges from sample 122 and signal waveform 124 interfere with one another, and detector 126 measures an interference signal between the two waveforms. The overall amplitude of the measured interference signal between the two waveforms is enhanced relative to the field amplitude of signal waveform 124 by output waveform 120*b*. In some embodiments, in a series of measurements, output waveform 120*b* and signal waveform 124 are variably delayed in time with respect to one another, and the spectral components of the interference signal between the two waveforms are detected (e.g. in a monochromator). Analysis of the resulting spectral amplitude fringes (e.g., by electronic control system 130) can yield the complex signal field. This measurement and analysis procedure is referred to as spectral interferometry.

In certain embodiments, spectrometer 200 can be configured for operation in a homodyne detection mode. In homodyne mode, signal waveform 124 emerges from sample 122 along a direction that is not spatially coincident with any of the directions of output waveforms 120. As a result, the signal measured by detector 126 corresponds only to signal waveform 124, and typically has a smaller amplitude than signals measured in heterodyne mode.

Beam shaper 104 is generally configured to produce multiple intermediate waveforms 114 from an input waveform 112. In some embodiments, as shown in FIG. 2, beam shaper 104 can produce four intermediate waveforms 114. In certain embodiments, beam shaper 104 can produce fewer than four intermediate waveforms 114 (e.g., three intermediate waveforms, two intermediate waveforms). In some embodiments, beam shaper 104 can produce more than four intermediate waveforms 114 (e.g., five intermediate waveforms, six intermediate waveforms, or even more than six intermediate waveforms).

In general, beam shaper 104 (e.g., including diffractive element 204 in FIG. 2) is configured to produce intermediate waveforms 114 (and output waveforms 120) that satisfy a phase matching condition at the position of sample 122. That is, the intermediate waveforms 114 produced by beam shaper 104 are directed along specific spatial propagation trajectories so that when output waveforms 120 are spatially coincident on sample 122, the output waveforms satisfy both wavevector matching conditions and frequency-matching conditions for generating signal waveform 124 in sample 122.

Figure 3:
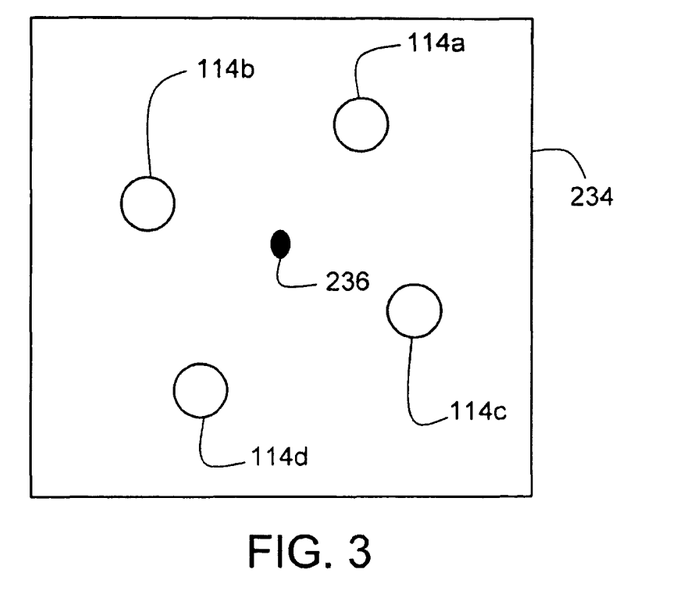
FIG. 3 is a schematic diagram showing positions of intersection of intermediate waveforms with a plane transverse to the optical axis of a modulator.

As an example, consider a plane 234 oriented transverse to the optical axis of beam shaper 104 (e.g., the optical axis of beam shaper 104 is coincident with the direction of propagation of input waveform 112), and located at position 232 between lens 206 and beamsplitter 208. FIG. 3 shows a schematic diagram of plane 234 and the positions of intersection of intermediate waveforms 114*a-d* with plane 234. Optical axis 236 of beam shaper 104 is also shown. Intermediate waveforms 114*a-d* are positioned at the four corners of a rectangle (e.g., the rectangle can be a square) in plane 234. If plane 234 was located at position 238 or position 240 (e.g., transverse to the optical axis of lenses 218, 222, and 224), modulated intermediate waveforms 118*a-d* and output waveforms 120*a-d*, respectively, would be similarly positioned at the four corners of a rectangle in plane 234, although the relative positions of the waveforms may differ (e.g., after propagating through the focal plane in which spatial filter 220 is positioned) and the size of the rectangle may differ. At sample 122, output waveforms 120*a*, 120*c*, and 120*d* combine to generate signal waveform 124 in sample 122. Output waveforms 120*a*, 120*c*, and 120*d* are generated so that they are phase matched with signal waveform 124 (e.g., the phase matching geometry shown in FIG. 3 is typically referred to as the boxcars geometry). In other words, the sum of the wavevectors of the output waveforms that generate signal waveform 124 (e.g., output waveforms 120*a*, 120*c*, and 120*d*) and the wavevector of signal waveform 124 satisfies the momentum conservation condition, and the sum of the frequencies of the four waveforms (e.g., 120*a*, 120*c*, 120*d*, and 124) satisfies the energy conservation condition. Optical waveform 120*b* provides a strong local oscillator signal that interferes with signal waveform 124 at detector 126 in the heterodyne mode of operation.

When spectrometer 200 is configured for homodyne operation, beam shaper 104 can be configured to produce only three intermediate waveforms 114*a*, 114*c*, and 114*d*. The three intermediate waveforms are positioned in plane 234 at three corners of a rectangle (e.g., which can be a square) as shown in FIG. 3. Similarly, if plane 234 was located at either of positions 238 or 240 (and transverse to the optical axis of lenses 218, 222, and 224), modulated waveforms 118*a*, 118*c*, and 118*d* and/or output waveforms 120*a*, 120*c*, and 120*d* would be located at three corners of a rectangle in plane 234, although the relative positions of the three waveforms (and the size of the rectangle) might be different. When output waveforms 120*a*, 120*c*, and 120*d* are incident on sample 122, signal waveform 124—which emerges from sample 122 and is detected by detector 126—satisfies both wavevector and frequency matching conditions with output waveforms 120*a*, 120*c*, and 120*d*.

As an alternative, when spectrometer 200 is configured for homodyne operation, beam shaper 104 can be configured to produce four intermediate waveforms 114*a-d*, as shown in FIG. 2. A spatial filter can be introduced into spectrometer 200 (e.g., spatial filter 220 positioned at the focal plane of lens 218, or another spatial filter positioned at another location) to filter out one of the intermediate waveforms 114a-d, one of the modulated intermediate waveforms 118a-d, or one of the output waveforms 120a-d, so that only three output waveforms 120 are incident on sample 122 and are phase matched with signal waveform 124.

The phase matching conditions discussed above correspond to four-wave mixing interactions in sample 122. More generally, beam shaper 104 can be configured to produce intermediate waveforms 114 to induce n-wave interactions in sample 122, where n is an integer larger than 2. For example, beam shaper 104 can be configured to produce five or six intermediate waveforms 114 (thereby producing five or six modulated intermediate waveforms 118 from modulation system 108, and five or six output waveforms 120 from output optics 110) to induce six-wave interactions in sample 122.

Further, modulation system 108 and output optics 110 can used together with beam shaper 104 to produce the required number of output waveforms 120. In the preceding discussion, the number of modulated intermediate waveforms 118 has been equal to the number of intermediate waveforms 114. In general, however, modulation system 108 can be used to either increase or decrease the number of modulated intermediate waveforms 118 relative to the number of intermediate waveforms 114, via various pulse shaping techniques. Further, in general, output optics 110 can be configured to produce a number of output waveforms 120 that is less than the number of modulated intermediate waveforms 118 (via spatial filtering, for example). Thus, the number of modulated intermediate waveforms 118 and/or the number of output waveforms 120 can be smaller than, larger than, or equal to the number of intermediate waveforms 114.

Moreover, beam shaper 104 can be configured to produce intermediate waveforms 114 in any spatial arrangement and/or propagating in any spatial directions, with respect to one another. Typically, as discussed above, the spatial arrangement and/or propagation directions are selected to satisfy phase matching conditions among output waveforms 120 at sample 122, although other non-phase matched spatial arrangements and/or propagation directions can also be used. In a plane transverse to the optical axis of beam shaper 104 (e.g., plane 234), the points of intersection of the multiple intermediate waveforms 114 with the plane can be positioned along the perimeter of a circle, or at certain corners and/or end points of regular figures such as parallelograms, triangles, crosses, rectangles, squares, and, more generally, m-sided figures (where m is an integer greater than 2). Some of the points of intersection of the multiple intermediate waveforms 114 can be spatially coincident at the position of plane 234. By changing and/or reconfiguring one or more modulating elements (e.g., active or passive) in beam shaper 104, the number and positions of intermediate waveforms 114 can be selected to measure particular types of spectra of sample 122.

In general, modulating system 108 can include one or more of the different types of modulators discussed above in connection with beam shaper 104, each of the one or more modulators being configured for operation in transmission mode or reflection mode. In some embodiments, modulating system 108 includes an active, programmable modulator that can modify the temporal properties of each of the dispersed intermediate waveforms 116 that are incident on the modulator. In other words, modulating system 108 can be configured to separately adjust each of the dispersed intermediate waveforms 116 to produce modulated waveforms 118 with independently specified temporal profiles.

When configured for operation in diffraction mode, modulating system 108 can generally independently adjust the temporal profiles of dispersed intermediate waveforms 116 that are separated in one spatial dimension (e.g., the y-direction in FIG. 2). Accordingly, intermediate waveforms 114 are typically generated by beam shaper 104 so that none of the intermediate waveforms 114 is located at the same position along at least one spatial axis. An example of this is shown in FIG. 3, where intermediate waveforms 114a-d are positioned at the four corners of a four-sided figure (e.g., a square or rectangle) in plane 234, and the rectangle or square is oriented at an angle (e.g., an angle of about 23 degrees in some embodiments) with respect to the x-z plane in FIG. 2.

Figure 4:
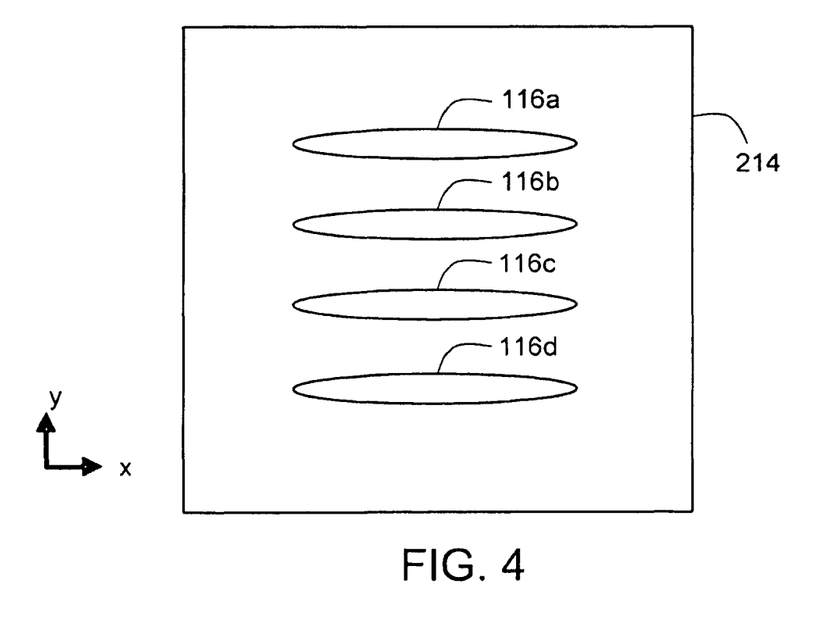
FIG. 4 is a schematic diagram showing positions of waveforms on a two-dimensional modulator.

When the frequency components of intermediate waveforms 114 are dispersed (e.g., by diffraction grating 210) to form dispersed intermediate waveforms 116, each of the dispersed intermediate waveforms is located at a different position along the y-direction of modulating system 108. FIG. 4 shows a schematic diagram of the positions of four dispersed intermediate waveforms 116a-d on an active modulator in modulating system 108. The four dispersed intermediate waveforms are produced from four intermediate waveforms 114a-d generated by beam shaper 104. As shown in FIG. 4, the frequency components of each of dispersed intermediate waveforms 116a-d are dispersed spatially along the x-direction, and each of dispersed intermediate waveforms 116a-d is located at a different position along the y-axis. As a result, modulating system 108 can be configured to independently adjust the temporal profiles of each of dispersed intermediate waveforms 116a-d.

In some embodiments, when modulating system 108 is configured to operate in a diffractive pulse shaping mode, each of the dispersed intermediate waveforms 116 can be diffracted into multiple diffraction orders along a direction (e.g., the y-direction) that is orthogonal to the direction in which the frequency components of waveforms 116 are dispersed. In diffractive pulse shaping mode, both phase and amplitude temporal shaping of each of the dispersed intermediate waveforms 116 can be achieved via suitable configuration of modulating system 108.

In certain embodiments, modulating system 108 can be configured to operate in a reflective pulse shaping mode (e.g., a zero-order only pulse shaping mode). In a reflective pulse shaping mode, phase-only temporal shaping of each of the dispersed intermediate waveforms 116 can be achieved via suitable configuration of modulating system 108.

In general, modulating system 108 can be configured to adjust the temporal profile of each of dispersed intermediate waveforms 116 in a variety of ways. For example, in some embodiments, adjustment of the temporal profile of dispersed intermediate waveforms 116 can include introduction and/or adjustment of particular temporal delays and/or phase shifts to one or more of dispersed intermediate waveforms 116. In certain embodiments, more complex adjustment of the temporal profile of dispersed intermediate waveforms 116 can be realized, including modifying any one or more of the dispersed intermediate waveforms to include particular temporal delays, phases, and/or amplitudes. Any one or more of dispersed intermediate waveforms 116 can be modified to include one radiation pulse or multiple pulses of radiation, each of the multiple pulses having a specified temporal delay, phase, and amplitude. Typically, modulating system 108 can be configured to adjust the temporal profile of some or all of dispersed intermediate waveforms 116 to produce output waveforms 120 that satisfy a particular phase matching condition at sample 122.

In certain embodiments, one or more additional modulators can be used to further adjust the properties of modulated intermediate waveforms 118 and/or output waveforms 120. For example, another two-dimensional modulator can be inserted between beamsplitter 208 and mirror 216 to further adjust modulated intermediate waveforms 118. By further modulating each of modulated intermediate waveforms 118, different frequency components in a given modulated intermediate waveform 118 can be independently adjusted to have different temporal profiles.

The pulse shaping systems disclosed herein permit measurement of multidimensional spectra of sample 122 in automated or semi-automated fashion. Such multidimensional spectral measurements bear certain similarities to multidimensional nuclear magnetic resonance (NMR) measurements, which are typically performed in various fields of physical and biological science. The multidimensional spectra obtained using the pulse shaping systems disclosed herein are typically obtained in one or more of the extreme ultraviolet, ultraviolet, visible, near-infrared, infrared, and microwave regions of the electromagnetic spectrum. As such, the methods disclosed herein enable measurement of electronic and vibrational properties and fast dynamical features of samples that NMR-based methods are not usually capable of resolving. Typically, NMR-based techniques probe dynamics and structure of samples by manipulating the nuclear spin state of the samples on microsecond time scales. In contrast, the systems and methods disclosed herein manipulate and probe electronic and/or vibrational states of samples on femtosecond time scales. Information that can be derived from such measurements includes vibrational and/or electronic information about samples, structural information about samples (which can be obtained and/or deduced from vibrational and/or electronic information), and information about dynamical responses of samples to external perturbations.

Multidimensional spectral measurements provide certain advantages relative to one-dimensional spectral measurements. In particular, overlapping spectral features that are difficult to resolve in crowded one-dimensional spectra can be separated through judicious projection of selected spectral features onto one or more additional frequency dimensions. As a result, important dynamical information that may be buried within broad spectral features, including information about interactions between different spectral features, can be extracted from the multidimensional spectral measurements. Information about high-lying vibrational or electronic states that may play important roles in chemical, optical, and/or other processes can also be extracted from the multidimensional spectra.

The systems disclosed herein are generally configured to operate as Fourier transform spectrometers, although other modes of operation are also possible. To measure a multidimensional spectrum of sample 122, electronic control system 130 (either fully automatically, or with input from a system operator) sends control signals to source 102, first modulator 104, and second modulator 108, to generate output waveforms 120 which are incident on sample 122. Electronic control system 130 also issues control instructions to detector 126 to detect signal waveform 124 emerging from sample 122 in response to the incident output waveforms 120.

In a two-dimensional spectral measurement of sample 122, the spectral response of sample 122 is measured along two different frequency coordinates. The measurement of signal waveform 124 corresponds to a one-dimensional measurement of a spectral response of sample 122 along a first of the frequency coordinates, at a fixed position along the second frequency coordinate. Typically, the spectral measurement along the first frequency coordinate is performed in the time domain, and then Fourier-transformed (e.g. by electronic controller 130) into the frequency domain of the first frequency coordinate. Following measurement of signal waveform 124, electronic control system 130 typically issues control instructions to second modulator 108 to adjust one or more properties (e.g. temporal delays and/or amplitudes and/or phases) of output waveforms 120 via modulation of the properties of dispersed intermediate waveforms 116. Modulating one or more properties of output waveforms 120 corresponds, in the Fourier domain, to selecting a new position along the second frequency coordinate. Sample 122 is then exposed to the adjusted output waveforms 120 to measure a second spectral response of sample 122 along the first frequency coordinate, at the newly selected position along the second frequency coordinate. As above, the second spectral response of sample 122 is typically measured in the time domain and Fourier-transformed into the frequency domain of the first frequency coordinate. This process is repeated to build up a two-dimensional spectral response profile of sample 122 as a function of both the first and second frequency coordinates.

To measure higher dimensional spectra, the procedure is similar. For example, for an n-dimensional spectral measurement of sample 122, each measured time domain response corresponds to a spectral measurement of sample 122 along one of the n spectral coordinates, at fixed positions along the remaining (n−1) spectral coordinates. By successively adjusting the properties of output waveforms 120, different positions along each of the (n−1) spectral coordinates can be selected to build-up the n-dimensional spectral response profile of sample 122.

In some embodiments, multidimensional spectra can be measured directly in the frequency domain. For example, the amplitude profiles of pulses in output waveforms 120 can be adjusted (e.g., via suitable configuration of modulating system 108) so that only a few of the dispersed frequency components of dispersed intermediate waveforms 116 are diffracted and recombined by output optics 110. This has the effect of restricting the spectral bandwidth of output waveforms 120 relative to input waveform 112. The central frequency of the restricted spectral bandwidth for some or all of output waveforms 120 can be iteratively scanned, while signal waveform 124 is measured by detector 126 each time the central frequency is changed. By measuring signal waveform 124 with a frequency-discriminating detector (e.g., a monochromator), a two-dimensional spectral response signal corresponding to sample 122 can be acquired.

In certain embodiments, methods which combine both temporal and spectral measurement techniques can be used to measure sample responses. As an example—and as discussed previously—spectral interferometry can be used to measure signal waveform 124. During heterodyne detection mode, signal waveform 124 interferes with a local oscillator waveform (e.g., output waveform 120b). Signal waveform 124 and the local oscillator waveform have a fixed temporal delay with respect to one another, and the interference between these waveforms is detected using a monochromator, for example. The measured spectral fringes are Fourier transformed, filtered, and then inverse Fourier transformed to obtain the complex signal in the frequency domain. The measurements and analysis are repeated for different relative delays between signal waveform 124 and the local oscillator waveform to build up a multidimensional spectrum of the sample response. In this hybrid method, one of the frequency dimensions is effectively measured directly in the frequency domain (e.g., via the monochromator), and the other frequency dimension is scanned in the inverse Fourier domain by adjusting relative time delays between the interfering waveforms.

In general, a variety of different sample responses can be induced by adjusting the properties—including one or more of the spatial positions, propagation directions, temporal delays, phases, temporal amplitudes, numbers of pulses, and other properties—of output waveforms 120. Generally, each of output waveforms 120 can be incident on sample 122 at a different time, or some (or all) of output waveforms 120 can be incident on sample 122 at the same time. In some embodiments, for example, at least two of output waveforms 120 can be temporally coincident in sample 122, and can overlap spatially to form a transient periodic modulation in the refractive index of sample 122 (e.g., a transient refractive index grating). Signal waveform 124 can correspond to an output waveform 120 that undergoes diffraction from the transient grating formed in sample 120.

In certain embodiments, at least two of output waveforms 120 can be temporally coincident in sample 122, and can overlap spatially to launch a vibrational disturbance in the sample. The vibrational disturbance can correspond, for example, to a traveling periodic vibrational wave that displaces sample atoms from their equilibrium positions. Signal waveform 124 can correspond to diffraction (or, more generally, scattering) of another one of output waveforms 120 from the periodic modulation in atomic positions within sample 122.

By generating output waveforms 120 with particular temporal delays, amplitudes, phases, spatial distributions, and propagation directions, a variety of other sample measurements can be performed. Such measurements include, for example, photon echo measurements, reverse photon echo measurements, reverse transient grating measurements, pump-probe measurements, correlation spectroscopic measurements, higher order ($\chi(5)$ and $\chi(7)$) resonant and/or non-resonant measurements, one- and two-quantum rephasing and nonrephasing measurements, photon-echo peak shift spectroscopic measurements, doubly and triply vibrationally enhanced four wave mixing measurements, multiple population period transient spectroscopy (MUPPETS), spectral hole burning measurements, and coherence transfer spectroscopic measurements.

In general, any of the methods discussed above can be implemented in computer hardware or software, or a combination of both. In particular, the methods discussed herein for controlling and configuring beam shapers and modulators, monitoring signals from samples exposed to temporally shaped waveforms, providing feedback signals, and analyzing measurement results to determine information about samples, can be implemented in hardware and/or software. The methods can be implemented in computer programs using standard programming techniques following the discussion herein. Program code is applied to input data to perform the functions described herein and to generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The methods can also be implemented as a computer-readable storage medium, configured with a computer program, where the storage medium so configured causes a computer to operate in a specific and predefined manner to perform the functions described herein.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A method comprising:
    Separating an input electromagnetic waveform into a plurality of intermediate waveforms, each of the intermediate waveforms being spatially separated from one another;
    dispersing frequency components of each intermediate waveform onto different regions of a spatial light modulator and modulating at least some of the dispersed frequency components with the spatial light modulator; and
    recombining the dispersed frequency components for each of the intermediate waveforms to produce a plurality of temporally shaped output waveforms,
    wherein the frequency components are dispersed on the spatial light modulator along a first direction and the spatial light modulator modulates the frequency components by diffracting them into multiple diffraction orders along a second direction different from the first direction.

2. The method of claim 1, further comprising focusing the plurality of temporally shaped output waveforms to a common region of a sample.

3. The method of claim 2, further comprising monitoring a change in a property of at least one of the output waveforms after it passes through the sample in response to changes in the modulation of one or more of the intermediate waveforms by the spatial light modulator.

4. The method of claim 3, wherein the change in modulation of the one or more intermediate waveforms causes a temporal delay between two or more of the output waveforms.

5. The method of claim 2, further comprising monitoring a change in a property of an additional waveform emerging from the sample in response to changes in the modulation of one or more of the intermediate waveforms by the spatial light modulator.

6. The method of claim 5, wherein the change in modulation of the one or more intermediate waveforms causes a temporal delay between two or more of the output waveforms.

7. The method of claim 2, wherein two of the plurality of output waveforms are incident on the sample at a first time, and a third of the plurality of output waveforms is incident on the sample at a second time later than the first time.

8. The method of claim 2, wherein each of the plurality of output waveforms is incident on the sample at a different time.

9. The method of claim 2, wherein two of the plurality of output waveforms form a periodic modulation in an index of refraction of the sample.

10. The method of claim 2, further comprising monitoring changes in a property of a waveform emerging from the sample in response to changes in the modulation of one or more of the intermediate waveforms, and analyzing the changes to determine at least one of vibrational information about the sample, electronic information about the sample, and structural information about the sample.

11. The method of claim 1, wherein a second modulator is used to separate the input waveform into the plurality of output waveforms.

12. The method of claim 11, wherein the second modulator is a diffractive optical element.

13. The method of claim 11, wherein the second modulator modulates a phase of the input electromagnetic waveform along two directions to produce the plurality of intermediate waveforms.

14. The method of claim 1, wherein modulating at least some of the dispersed frequency components comprises modulating a phase of at least some of the frequency components.

15. The method of claim 1, wherein the number of output waveforms is the same as the number of intermediate waveforms.

16. The method of claim 1, wherein the number of output waveforms is four.

17. The method of claim 1, wherein the number of output waveforms is three.

18. The method of claim 1, wherein separating the input electromagnetic waveform into a plurality of intermediate waveforms comprises modulating a phase of the input electromagnetic waveform along two orthogonal directions.

19. The method of claim 18, further comprising modulating the phase of the input electromagnetic waveform so that the output waveforms satisfy a phase matching condition at a sample position.

20. The method of claim 1, further comprising modulating at least some of the dispersed frequency components so that the output waveforms satisfy a phase matching condition at a sample position.

21. The method of claim 1, wherein the plurality of output waveforms comprises four output waveforms that propagate with respect to an optical axis, and wherein points of intersection of the four output waveforms with a plane transverse to the optical axis are positioned at each of four corners of a rectangle, the optical axis being positioned at the center of the rectangle.

22. The method of claim 21, further comprising directing the four output waveforms to be incident on a sample and monitoring changes in a property of a waveform emerging from the sample along a direction parallel to a direction of propagation of one of the four output waveforms entering the sample in response to changes in the modulation of one or more of the intermediate waveforms.

23. The method of claim 1, wherein the plurality of output waveforms comprises three output waveforms that propagate with respect to an optical axis, and wherein points of intersection of the three output waveforms with a plane transverse to the optical axis are positioned at three of the four corners of a rectangle, the optical axis being positioned at the center of the rectangle.

24. The method of claim 1, wherein a full width at half maximum spectral bandwidth of each of the output waveforms is 5 nm or more.

25. The method of claim 1, wherein the separated intermediate waveforms propagate with respect to an optical axis, and wherein points of intersection of the waveforms with a plane transverse to the optical axis are positioned at corners of an m-sided figure, where m is an integer greater than 2.

26. The method of claim 25, wherein the m-sided figure is a triangle.

27. The method of claim 25, wherein the m-sided figure is a square.

28. The method of claim 25, wherein the m-sided figure is a parallelogram.

29. An apparatus, comprising:
a beam shaper configured to separate an input electromagnetic waveform into a plurality of intermediate waveforms, each of the intermediate waveforms being spatially separated from one another;
dispersing optics positioned to disperse frequency components of each of the intermediate waveforms;
a spatial light modulator positioned so that the frequency components of each of the intermediate waveforms are dispersed onto different regions of the spatial light modulator, and configured to modulate at least some of the dispersed frequency components; and
output optics positioned to combine the dispersed frequency components of each of the intermediate waveforms to produce a plurality of temporally shaped output waveforms.

30. The apparatus of claim 29, wherein the frequency components of the intermediate waveforms are dispersed on the spatial light modulator along a first direction, and wherein the spatial light modulator is configured to diffract the frequency components into multiple diffraction orders along a second direction different from the first direction.

31. The apparatus of claim 30, wherein the output optics are configured to combine selected orders of the multiple diffraction orders to produce the output waveforms.

32. The apparatus of claim 29, wherein the dispersing optics and the output optics share one or more common elements.

33. The apparatus of claim 29, wherein the beam shaper comprises a two-dimensional binary phase grating.

34. The apparatus of claim 29, wherein the beam shaper comprises a two-dimensional modulator comprising a plurality of independently adjustable regions.

35. The apparatus of claim 29, further comprising an electronic controller coupled to the spatial light modulator and configured to adjust the spatial light modulator to modulate the frequency components, and a detector positioned to measure a signal waveform from a sample that is exposed to the output waveforms.

36. The apparatus of claim 29, wherein the separated intermediate waveforms propagate with respect to an optical axis, and wherein points of intersection of the waveforms with a plane transverse to the optical axis are positioned at corners of an m-sided figure, where m is an integer greater than 2.

* * * * *

UNITED STATES PATENT AND TRADEMARK OFFICE
CERTIFICATE OF CORRECTION

PATENT NO.        : 9,074,936 B2                                Page 1 of 1
APPLICATION NO.   : 12/147842
DATED             : July 7, 2015
INVENTOR(S)       : Nelson et al.

It is certified that error appears in the above-identified patent and that said Letters Patent is hereby corrected as shown below:

Column 18

Line 22, Claim 1, delete "Separating" and insert -- separating --

Signed and Sealed this
Seventeenth Day of November, 2015

Michelle K. Lee
*Director of the United States Patent and Trademark Office*